(No Model.)
T. MABBETT, Jr.
Mole Trap.
No. 242,208.            Patented May 31, 1881.
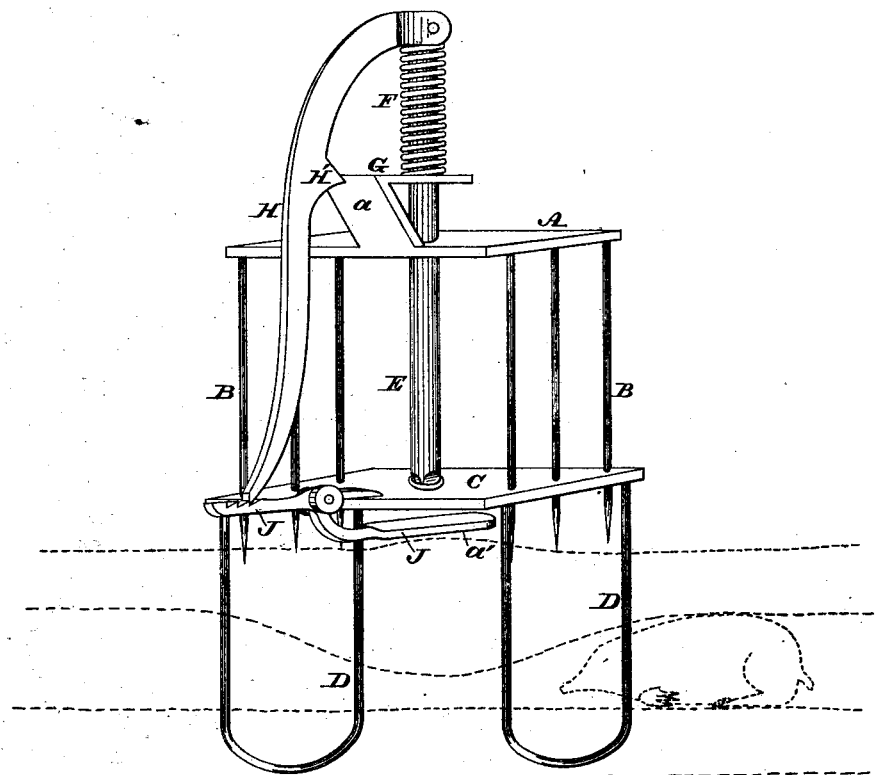
Witnesses:
A. P. Grant
W. F. Kircher
Inventor:
Truman Mabbett, Jr.
by John A. Diedersheim
ATTORNEY.

UNITED STATES PATENT OFFICE.

TRUMAN MABBETT, JR., OF BEIDEMAN STATION, NEW JERSEY.

MOLE-TRAP.

SPECIFICATION forming part of Letters Patent No. 242,208, dated May 31, 1881.

Application filed March 22, 1881. (No model.)

*To all whom it may concern:*

Be it known that I, TRUMAN MABBETT, Jr., a citizen of the United States, residing at Beideman Station, in the county of Camden, State of New Jersey, have invented a new and useful Improvement in Mole-Traps, which improvement is fully set forth in the following specification and accompanying drawing, in which the figure is a perspective view of the mole-trap embodying my invention.

The invention consists of a dropping-plate provided at each end with downwardly-projecting prongs, in combination with a plate having depending feet, a tripping-piece, lever, shaft, and spring, whereby the mole may be readily caught, and provision is made for catching him at either end of the trap. The two feet also serve to steady the trap at both ends.

It also consists of the trap having feet of U shape for guarding the impaling-prongs thereof.

Referring to the drawing, A represent a plate, carrying depending prongs B, and C represents a plate, which is pierced to receive the prongs B, and has at each end a depending open foot, D, of staple or U shape, the crowns or bends being below.

Attached centrally to the lower plate, C, is a shaft, E, which extends upwardly through an opening in the plate A, and is encircled at its upper end by a spring, F, which bears against a plate or piece, G, which is formed with or secured to the upper side of the plate A by means of an attached inclined piece, a. The upper end of the spring F bears against the upper end of a lever, H, which is pivoted to the top of the shaft E, and formed with a nose, H', adapted to engage with the inclined piece a of the plate G. The lower end of the lever H is sharpened or pointed and engages with the notched end of a tripping-piece, J, which is pivoted to the lower plate, C, and has a portion of its length, when the trap is set, extended under said plate C, as at a'.

The operation is as follows: The feet D are inserted or forced in the ground so that their open portions coincide with the burrow formed by the mole. In this operation the prongs B are within the spaces of the feet D, and have their points guarded by the crowns or bends thereof. The plate A is then raised and the lever H engaged with one of the notches of the tripping-piece J. The nose H' bears against the inclined piece a, and as the lever H is held immovable the contact of the piece a with the upper side of said nose H' prevents descent of the plate A, and consequently of the prongs. The part a' of the tripping-lever J is above the ground or overhangs the burrow, and all parts of the trap as thus set are located as shown in the drawings. When the mole reaches the first foot D he passes into the same without interruption; but when the rising earth or the back of the animal presses against the tripping-piece J the notched end of the latter is forced down, and the lever H, being released, springs out, clearing the nose H' of the inclined piece a. The plate A, being no longer controlled by the lever H, is forced down by the action of the spring F, and the prongs rapidly descend, and either set of them pierces the mole, the effect whereof is evident. The feet D D, being loop-shaped, catch under the impaled mole as the trap is lifted, and thus insure its removal.

Before setting the trap, or at the time of such setting, the earth is forced down into the burrow-hole, partly closing the same, as shown in the drawing, so that the mole, in passing through this narrow place, will raise the earth which forms the roof of his hole or burrow. The hollow left in the surface by such depression is filled by earth, so that the earth thus filled in will be raised by the mole against the trigger. If the depression were not filled in, the distance between the trigger and the soil would be too great.

The feet at the ends of the plate C steady the trap and prevent it from overturning when sprung. When the prongs descend they enter the ways previously formed by the passage of the feet, and therefore are not required to form their own openings.

Having thus described my invention, what I claim as new, and desire to secure by Letters Patent, is—

1. The dropping plate A, having at each end a row of downwardly-pointing prongs, B B, in combination with plate C, having depending feet at each end thereof, the tripping-piece J, lever H, shaft E, and spring F, substantially as set forth.

2. The trap having a movable upper plate provided with prongs, a fixed lower plate, and U-shaped feet extending downward from said lower plate below said prongs, so that their crowns or arches will guard the points thereof.

TRUMAN MABBETT, JR.

Witnesses:
JOHN A. WIEDERSHEIM,
F. COOPER.